Jan. 30, 1940.  I. N. ODELL ET AL  2,188,690
FILM MAGAZINE
Filed Dec. 28, 1938  4 Sheets-Sheet 1
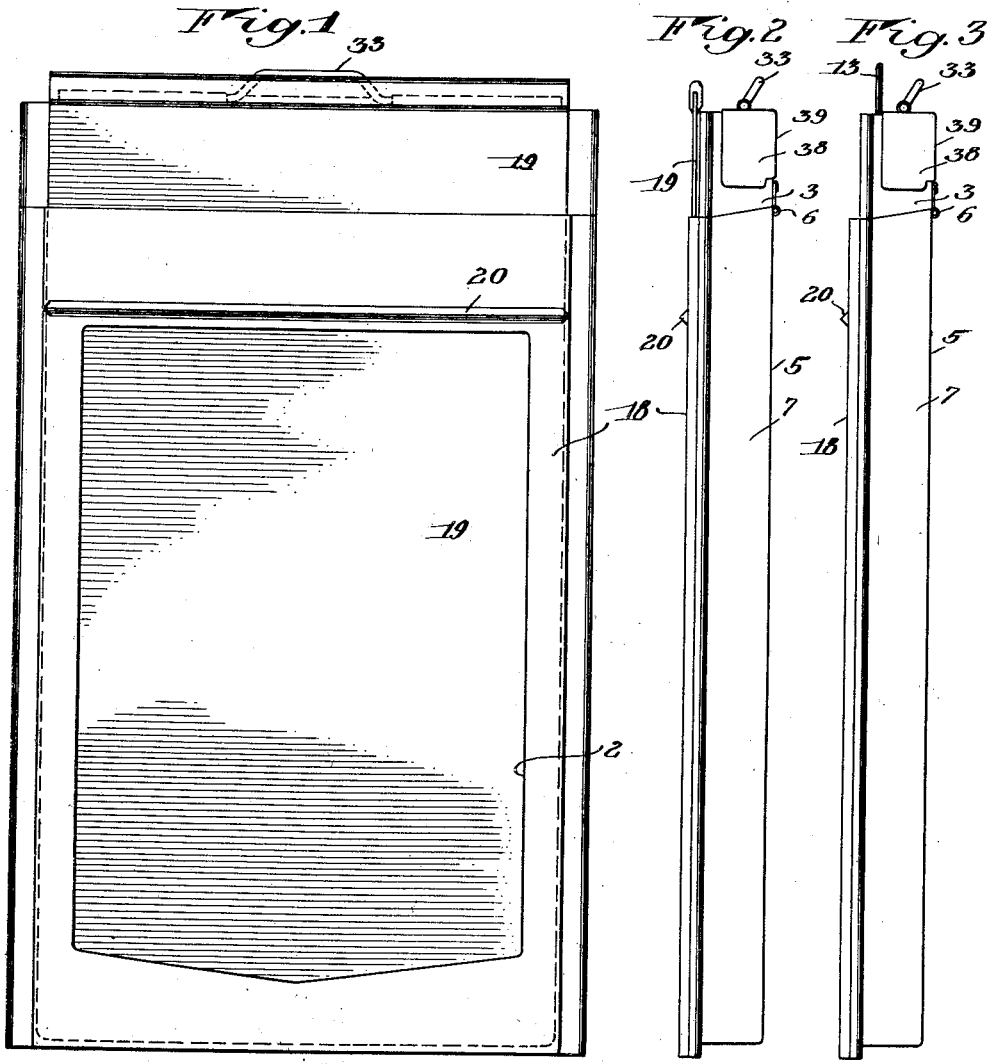
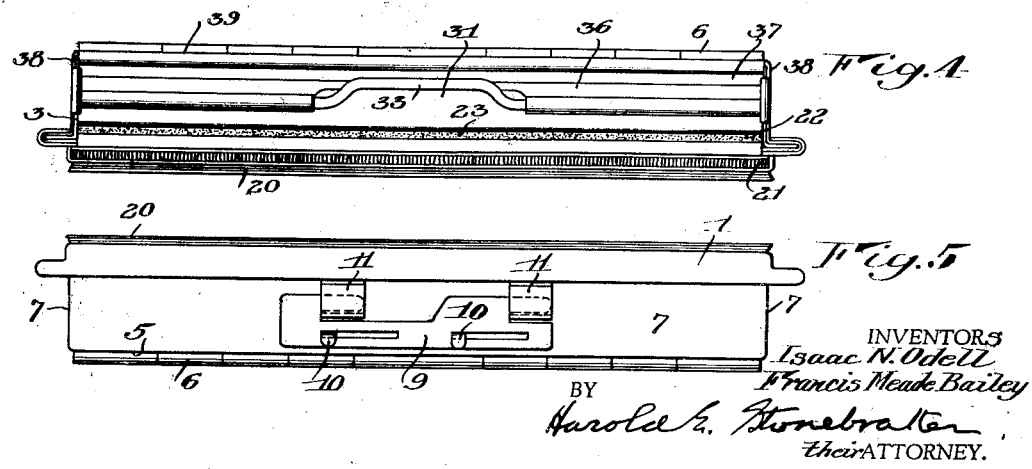
INVENTORS
Isaac N. Odell
Francis Meade Bailey
BY Harold E. Stonebraker
their ATTORNEY.

Jan. 30, 1940. I. N. ODELL ET AL 2,188,690
FILM MAGAZINE
Filed Dec. 28, 1938 4 Sheets-Sheet 2
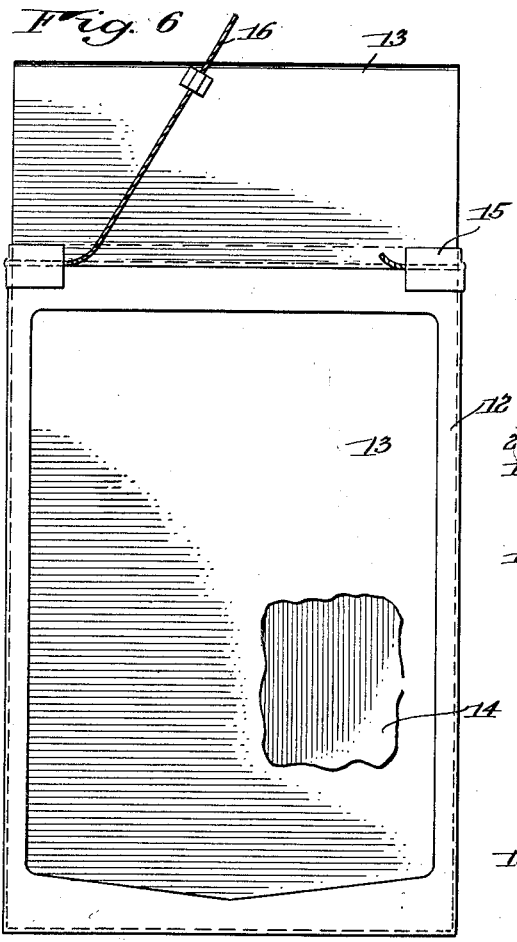
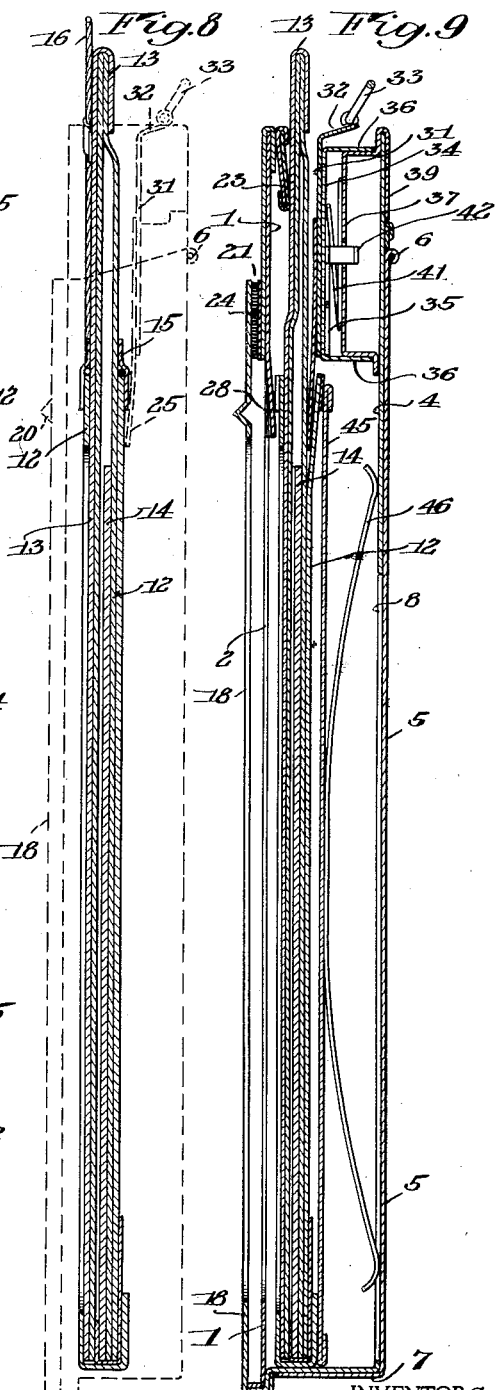
INVENTORS
Isaac N. Odell
Francis Meade Bailey
BY Harold E. Stonebraker
their ATTORNEY.

Jan. 30, 1940.  I. N. ODELL ET AL  2,188,690
FILM MAGAZINE
Filed Dec. 28, 1938  4 Sheets—Sheet 3
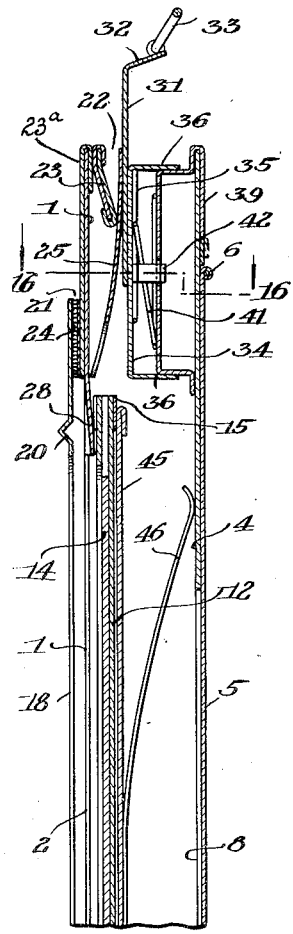
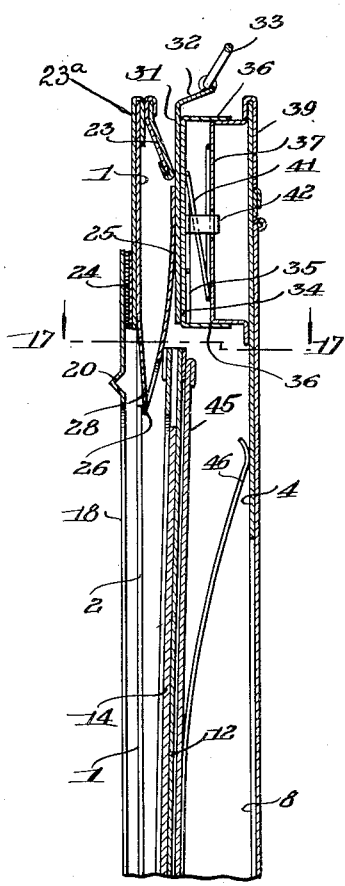
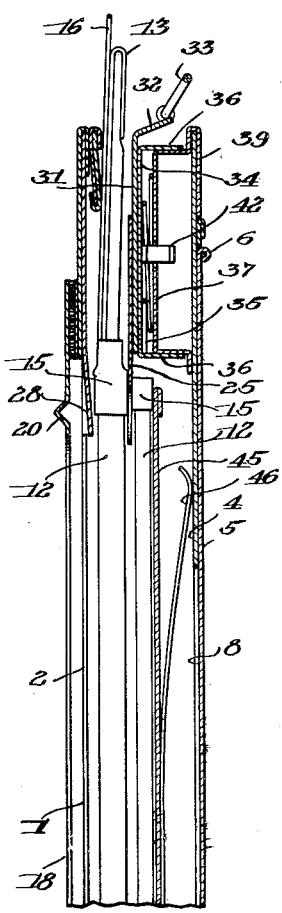
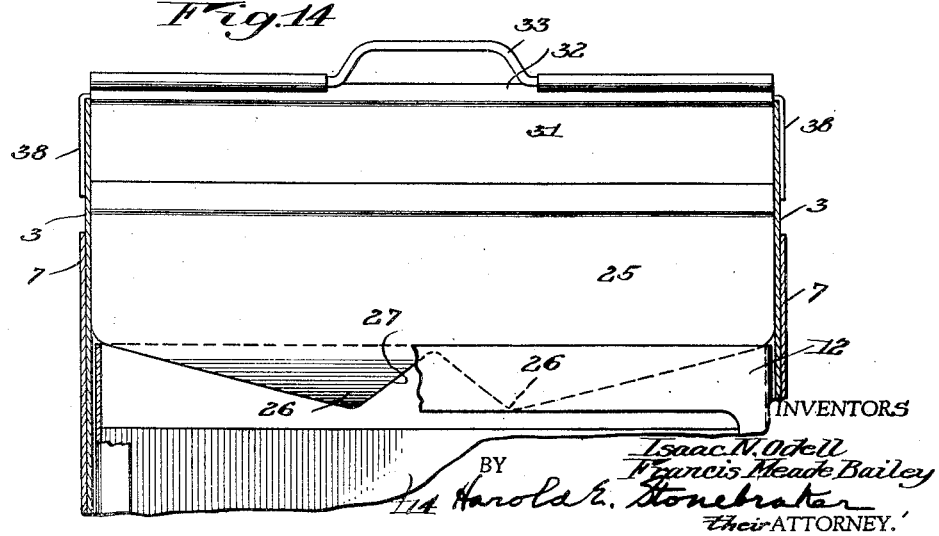

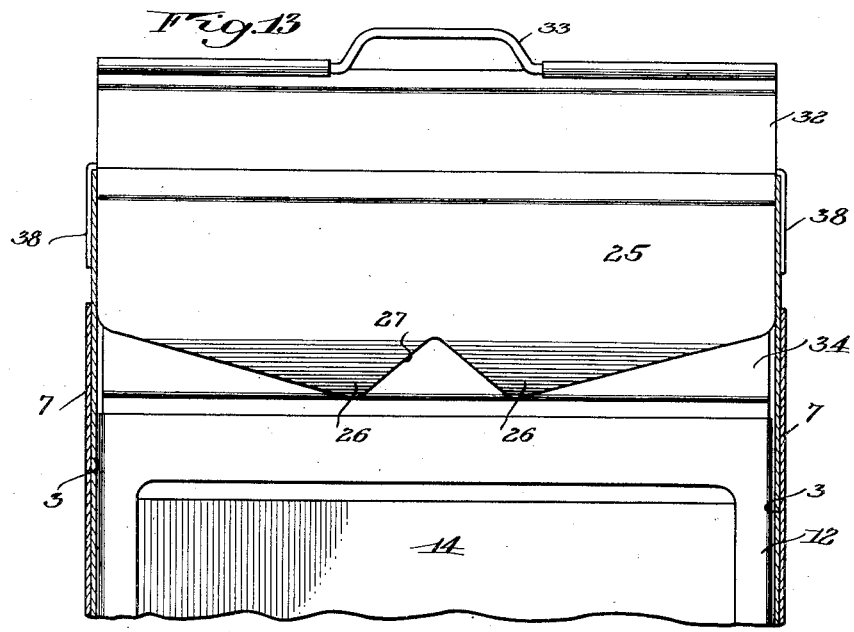
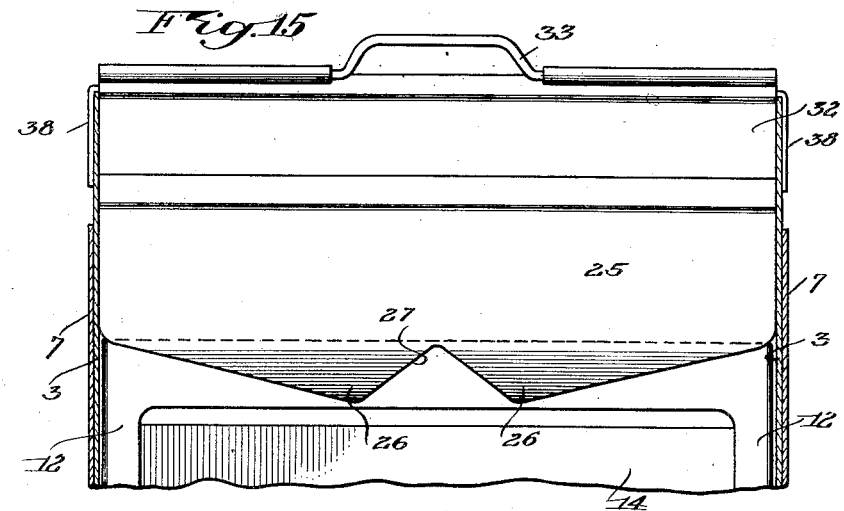
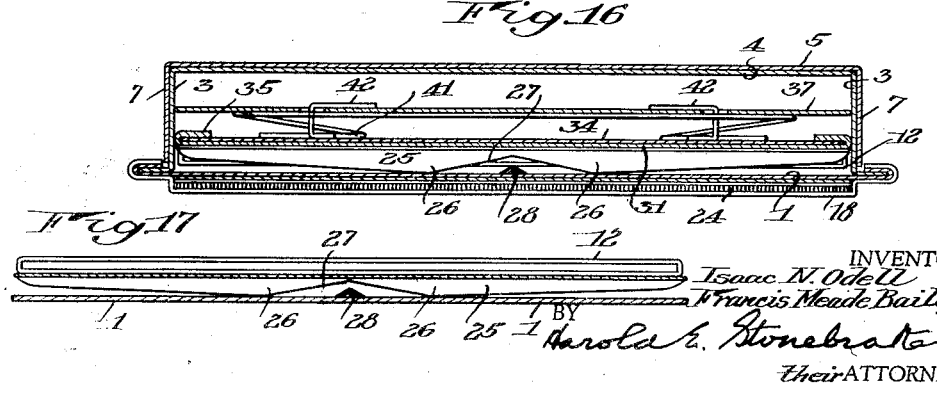

Patented Jan. 30, 1940

2,188,690

UNITED STATES PATENT OFFICE 2,188,690

FILM MAGAZINE

Isaac N. Odell, Rochester, N. Y., and Francis Meade Bailey, Ames, Iowa, assignors to Defender Photo Supply Company, Incorporated, Rochester, N. Y., a corporation of New York Application December 28, 1938, Serial No. 248,088

17 Claims. (Cl. 95—72)

This invention relates to a film magazine that is removably positionable in a camera back in a manner analogous to a plate holder or film pack adapter, and is constructed to receive for successive exposure a number of individual film packages or envelopes of paper or thin cardboard which are inserted into the magazine one at a time, each after the previously inserted film has been exposed, the several film envelopes being retained in the magazine until the limit of its capacity is reached, when it is removed from the camera and unloaded in a dark room for developing.

The invention is intended for use in connection with a film package of paper, cardboard, or other light weight material, such as illustrated in Patent No. 2,082,257, June 1, 1937, or any film holder in which a sheet of light sensitive material is arranged within an outer envelope that may also receive an inner envelope or light guard surrounding the light sensitive sheet and adapted to be removed to uncover the latter after the package has been inserted into a magazine, and one object of the invention is to afford a construction that will properly guide such a film package as it is inserted into the magazine, and in a way such that it will not engage or tear the open end of a previously inserted film envelope, or be held thereby against movement into the magazine.

More particularly the invention comprehends a structure including a displaceable guide member that is located on one side of a film package as the latter is first inserted into a magazine, and by successive operations, is positionable first between the walls of the outer film envelope, and finally on the opposite side of the outer envelope, in which final position the guide member overlies the envelope already in the magazine and is between it and the outer wall of a newly inserted envelope, thus preventing the latter from contacting the edges of the walls at the open end of the envelope in the magazine, but causing it to ride thereover without interference.

An additional object of the invention is to afford an arrangement that will hold a series of film packages of cardboard or light weight material, permitting their independent insertion successively after each exposure, the parts being so constructed that all open portions or joints of the magazine are thoroughly sealed against light, and the displaceable guide member can partake of its necessary movement for insuring proper insertion of a film package into the magazine, without admitting light to the interior anywhere between the magazine and the displaceable guide member.

Another purpose of the invention is to provide a guide member embodying spring finger portions that are positionable alternately on opposite sides of a film envelope, the guide member being slidably displaceable on a support that is actuated transversely of the inlet opening of the magazine to close the opening, and held to the limit of its transverse movement by spring means so as to afford engagement of the fingers of the guide member with the film package as it is inserted.

Another purpose of the invention is to afford a simple and practical construction that can be manufactured at a reasonable cost, which permits easily opening the magazine for unloading and can otherwise be readily operated, and which also insures light-tight connections between the body of the magazine and the movable portions thereof.

To these and other ends, the invention consists in the construction and arrangement of parts that will appear clearly from the following description when read in conjunction with the accompanying drawings, the novel features being pointed out in the claims following the specification.

In the drawings:

Fig. 1 is a plan view of a magazine removed from a camera, and showing a preferred embodiment of the invention;

Fig. 2 is a side elevation of the construction shown in Fig. 1 with the light guard in position;

Fig. 3 is a similar view with the light guard removed and showing a film package inserted;

Fig. 4 is an end elevation of the construction shown in Fig. 1, looking toward the inlet opening that receives the film package;

Fig. 5 is an end elevation of the construction shown in Fig. 1 looking toward the opposite end, and showing the locking means for holding the hinged back wall engaged with the body portion of the magazine, the back wall being unlocked and swung away from the body portion to permit unloading;

Fig. 6 is a plan view of one form of film package with which the magazine is intended to be used, showing the parts sealed as when inserted;

Fig. 7 is a similar view of the envelope, partially broken away, showing it as it would appear in the magazine after the seal is broken, the inner envelope or light guard having been removed from the outer envelope, and the light sensitive sheet being ready for exposure through the exposure wall of the envelope;

Fig. 8 is a longitudinal sectional view showing the position of the parts when a film package such as illustrated in Fig. 6 is initially inserted into the magazine, before breaking the seal;

Fig. 9 is a similar longitudinal sectional view showing the position of the parts after the envelope seal is broken and the guide member has been operated outwardly and again inwardly to position its finger portions between the outer and inner envelopes of the film package, so as to hold the outer envelope while removing the inner envelope or light guard;

Fig. 10 is a similar sectional view, somewhat enlarged and partially broken away, showing the position of the parts after the inner envelope of the film package has been removed and the displaceable guide member slid outwardly, away from engagement with the interior of the outer envelope;

Fig. 11 is a view similar to Fig. 10, showing the position of the parts after the guide member has been again moved inwardly to its normal position, and its finger portions have ridden over the film envelope so as to cover the edges of its walls at its open end and hold them out of the path of the package next to be inserted;

Fig. 12 is a similar sectional view showing the position assumed by the parts when another film package is inserted between the guide member, which overlies the open end of the first film envelope, and the exposure wall of the magazine;

Fig. 13 is a horizontal sectional view, partially broken away, showing the position of the parts corresponding to Fig. 10, with the guide member displaced outwardly with relation to the film package;

Fig. 14 is a similar sectional view, showing the position of the parts corresponding to Fig. 9, with the guide member located between the walls of the outer envelope of the film package, the outer envelope being partially broken away;

Fig. 15 is a similar sectional view showing the position of the parts corresponding to Fig. 11, with the guide member located between the film package and the exposure wall of the magazine, and in position to guide a second film package into operative relationship in the magazine;

Fig. 16 is a transverse sectional view on the line 16—16 of Fig. 11 looking in the direction indicated, and Fig. 17 is a transverse sectional view on the line 17—17 of Fig. 11 looking in the direction indicated, showing the relation of the guide member and finger portions to the deflected film package.

The embodiment of the invention herein disclosed, which is intended merely as illustrative of one practical adaptation, is intended for use with a film package or envelope such as disclosed in Patent No. 2,082,257, dated June 1, 1937. The structure disclosed in the patent referred to includes in general an outer envelope containing a sheet of light sensitive material, or film, and a second envelope or light guard surrounding the film and located within the first mentioned or outer envelope, and designed to hold the film in light-tight relation to the outer envelope until the package is positioned in a camera back, whereupon a seal can be broken and the inner envelope removed, leaving the outer envelope and its contained film within the camera ready for exposure.

An operator may carry a large number of such light weight, thin film packages, each of which maintains its film in light-tight condition until it is in the magazine, and may successively insert a series of such film packages into a magazine where they are successively exposed and retained. When filled with film, the magazine is removed from the camera until suitable dark room facilities enable unloading it and removing the film. The problem heretofore has been to provide a film magazine with structure that would permit inserting successive film packages without interference, or without being obstructed by the free edges of the open end of the envelope previously inserted, or in other words, to guide a film package as it is inserted into proper position over the previously inserted package or packages, until the capacity of the magazine is reached.

In general, this is accomplished by a guide member in the magazine inlet opening that is yieldably held against the film package and is displaceable endwise thereof, so that after inserting a film package such as described and breaking the seal, the guide member is displaced outwardly of the magazine and then returned to its initial position, causing it thereupon to occupy a position between the outer envelope and the inner light guard envelope of the film package. In this position, the guide member functions to hold the outer envelope while the operator pulls out the inner light guard envelope and removes it entirely from the magazine, leaving the outer envelope and its contained film within the magazine ready for exposure. The guide member is thus positioned between the back and front walls of the film envelope and is again displaced endwise and returned to its initial position, causing it thereupon to assume a position over both walls of the film envelope, that is, between the envelope and the exposure wall of the magazine. After exposure of the film already inserted, the guide member is in position to receive a second film package, and to guide it into the magazine over the edges of the open end of the film envelope previously positioned, and a multiplicity of film packages can be thus successively inserted and the films exposed until the magazine is filled, whereupon it is removed from the camera and unloaded in a dark room for developing the film.

Referring more particularly to the drawings, in which like reference numerals refer to the same parts throughout the several views, the magazine includes a body portion consisting of the front or exposure wall 1 having an exposure opening 2 therein and side walls 3, and a light guard or back wall portion 4, see Figs. 1 and 10, while 5 designates the main back wall which is hinged to the body portion at 6 and includes the side walls 7 adapted to embrace the aforementioned side walls 3 of the body portion, the hinged back wall being movable away from the body portion about the pivotal point 6 to permit unloading the magazine through the opening 8 beneath the back wall portion 4. The movable back wall is held in closed relationship with the body portion of the magazine by means of the slidable locking member 9 which is slidable on the guides 10 carried by the side wall 7 of the hinged back wall, and engages suitable fasteners 11 carried by the body portion 1 and located in the path of the locking member 9 when the magazine is closed, as shown in Fig. 5.

In Figs. 6 and 7 is illustrated a form of film package or envelope such as may be used in the magazine herein disclosed, and constructed of paper, cardboard or other light weight material. Such a film package includes an outer envelope closed at its sides and one end and having a front or exposure wall 12 and a suitable back wall, an inner envelope or light guard 13 open at its inner end and having connected opposed walls located within the outer envelope and enclosing the sheet of film or light sensitive material 14, the latter being protected by the light guard 13 until the package is inserted into a magazine for exposure. The parts are held in this relation until ready for use by means of a suitable seal 15 which holds the inner envelope or light guard 13 in fixed relation to the film and outer envelope 12, while 16 is a pull string for breaking the seal 15 after the package is inserted into a magazine. When the seal 15 is broken, the light guard or inner envelope 13 is pulled outwardly and removed, leaving the outer envelope with exposure wall 12 and its contained film 14 within the camera ready for exposure, and it is to be understood that the structure now to be described will receive a series of such film packages one after the other to the limit of capacity of the magazine, thus doing away with the necessity of using the cumbersome and heavy plates and plate holders now in use.

Located above and spaced from the exposure wall 1 of the magazine, and surrounding the opening 2, is an outer wall 18, see Fig. 10, affording guideways between the walls 1 and 18 to receive the light slide 19, see Fig. 2, which is removed from the magazine after the film package is inserted and ready for exposure. 20 designates a transverse rib on the outer wall 18 adapted to make a light-tight engagement with the opening in a camera back when the magazine is inserted, as usual in the case of plate holders. The light slide 19 is inserted through the opening 21, while 22 designates the inlet opening through which the film package is inserted, as shown in Fig. 12, the film package or envelope entering between a yieldable light guard 23 extending across the opening and the guide member which will now be described in detail. The guard 23 is preferably carried by a plate 23ª which slidably embraces the wall 1, and also carries a strip of light-tight material 24 fitting in the opening 21 and cooperating with the light slide 19.

The guide member includes preferably a curved plate of spring metal designated at 25, see Figs. 10 and 11, that yieldably engages the film package as it is inserted and guides it to proper position. To effect this, the guide member or spring metal plate 25 includes two pointed finger portions 26, see Fig. 14, between which is a recessed portion 27, said finger portions 26 and recessed portion 27 defining the forward edge of the guide member which in Fig. 14 is shown located over a previously inserted and already exposed film and film envelope. The wall 1 of the body portion of the magazine is indented inwardly adjacent to the exposure opening to afford a projection 28, see Figs. 10 to 12 and 17, said projection 28 engaging the marginal portion of a film package at the center thereof transversely and pressing it inwardly, as shown in Fig. 17, away from the wall 1 and guide member. The recessed portion 27 straddles the projection 28, while on opposite sides thereof, the finger portions 26 engage said wall 1, thus insuring the finger portions 26 moving over the previously inserted film envelope between it and the wall 1, as shown in Fig. 11, when the guide member is displaced endwise of the film package by sliding it first outwardly as in Fig. 10 and then returning it to its initial position as shown in Fig. 11.

To effect this necessary movement of the guide member 25, it is mounted fixedly on a slide 31, see Fig. 16, which carries at its outer end a depending light guard portion 32 carrying the handle 33 by which it is readily pulled to its outermost position, as shown in Fig. 10. The slide 31 is movable forwardly and backwardly on the channel-shaped support 34, see Fig. 16, said slide 31 having flanges 35 which embrace the underside of the support 34 with sufficient play to permit the necessary sliding movement of the guide member on the support.

The support 34 includes depending walls 36 which limit the forward and backward movement of the slide 31 and the guide member carried thereby, and the support 34 with its depending walls 36 is telescopically mounted for movement transversely of the magazine on the channel-shaped base 37 which may be formed integrally with exterior portions 38, see Figs. 2 and 3, and a back wall 39 by which the entire assembly just described may be slidably and frictionally engaged on the body portion of the magazine, or the channel-shaped base 37 may if preferred be permanently attached to the body portion of the magazine.

In order to actuate the guide member and its slide transversely of the inlet opening and toward the film package as it is inserted, a coil spring 41, see Fig. 10, is located between the channel base 37 and the support 34 which is telescopically arranged on the base, the spring 41 acting to move the support 34 laterally, see Fig. 10, while 42 designates suitable limiting stop members carried by the support 34 and extending through openings in the base 37 to limit the relative movement between the telescoping support 34 and the base on which it moves. This arrangement is such as to permit a yieldable bodily movement of the spring guide member toward the film package as the latter is inserted, holding it in proper engagement therewith and also permitting the necessary displacement of the guide member and its slide, while at all times maintaining a light-tight relation with the magazine.

With the parts arranged as described, and as shown in Figs. 1 and 2, when a film package such as described is inserted through the opening 22, see Fig. 10, it occupies the position shown in Figs. 3 and 8, causing the light guard 23 to be pressed outwardly and the guide member with its finger portions 26 to be pressed inwardly. With the parts in this position, the string 16 is pulled to break the seal between the inner and outer envelopes, and the guide member is then displaced outwardly as far as it will go and then returned to its initial position. Upon the return movement of the guide member, its finger portions 26 enter between the inner and outer envelopes of the film package, as shown in Fig. 9, and the ends of the guide member engage under the side wall of the outer envelope at its edges, as shown in Fig. 14, being thus in position to hold the outer envelope in such position and lock it against outward movement. The inner envelope can then be removed by pulling it outwardly, leaving the outer envelope and its contained film within the magazine ready for exposure.

Then by again displacing the guide member outwardly, and returning it to its initial position, the finger portions 26 engage over the outer or exposure wall of the film envelope, as shown in Fig. 11, and the film is ready for exposure. The light slide 19 can be removed and the film exposed in the usual manner, after which the light slide is reinserted and a second film package can be inserted in the same manner as already described. When the second film package is inserted, the finger portions 26 entirely overlie the outer end of the exposure wall of the previously inserted film envelope, as shown in Fig. 15, so that the newly inserted package slides in over the previously inserted package and assumes a position thereabove, as illustrated in Fig. 12, with the guide member between the previously exposed film envelope and the newly inserted film package, whereupon the operations already described are repeated. Additional film packages may be inserted and exposed until the magazine is filled, when it is removed from the camera and opened in a dark room to unload the several films for developing.

The back wall portion 4, see Fig. 10, which extends for a substantial distance beyond the hinged connection 6 of the back wall 5, affords an effective light seal for the hinged joint of the movable back wall 5, while at the same time it permits unloading the magazine through the opening 8 when the movable back wall is unlocked and swung away from the body portion.

The film packages or envelopes are held snugly within the magazine by means of the follower plate 45 which carries an actuating leaf spring 46, one end of which engages the back wall portion 4, as shown in Figs. 9 to 12, while the other end engages the main back wall 5, the spring follower being removable from the magazine when it is to be unloaded.

While the invention has been described with respect to the disclosed embodiment, it is not confined to the precise details or arrangements shown, and this application is intended to cover any modifications or departures that may come within the purposes of the improvement or the scope of the following claims.

We claim:

1. The combination with a film magazine having an inlet opening, of a support carried by the magazine and located to one side of said opening, a guide member extending across said opening and mounted on said support, said guide member being movable endwise of the magazine in opposite directions to occupy positions successively on opposite sides of a film package, the innermost portions of the guide member being positionable successively slightly inwardly and slightly outwardly of the outer end of a film package when the latter is in the magazine.

2. The combination with a film magazine having an inlet opening, of a support yieldably mounted on the magazine at one side of said opening, a guide member extending across said opening and mounted on said support, said guide member being movable endwise of the magazine in opposite directions to occupy positions successively on opposite sides of a film package, the innermost portions of the guide member being successively positionable slightly inwardly and slightly outwardly of the outer end of a film package when the latter is in the magazine.

3. The combination with a film magazine having an inlet opening, of a support yieldably mounted on the magazine and located to one side of said opening, a guide member extending across said opening, and a slide mounted on said support movable endwise of the magazine and carrying the guide member, said yieldable support permitting movement of the slide and guide member transversely of said opening, and the innermost portions of the guide member being successively positionable slightly inwardly and slightly outwardly of the outer end of a film package when the latter is in the magazine.

4. The combination with a film magazine having an inlet opening, of a support carried by the magazine and located to one side of said opening, a guide member extending across said opening, a slide mounted on said support and movable endwise of the magazine and carrying the guide member, a base on which the support is arranged for transverse movement, spring means between the base and said support, and means limiting movement of the support on the base, the innermost portions of the guide member being successively positionable slightly inwardly and slightly outwardly of the outer end of a film package when the latter is in the magazine.

5. The combination with a film magazine having an inlet opening, of a spring metal guide member movable endwise of the magazine from a position slightly inwardly of said opening to a position substantially within the opening and beyond the outer end of a film package positioned within the magazine, and a transversely yieldable support for the guide member, carried by the magazine and located to one side of said opening.

6. The combination with a film magazine having an inlet opening, of a spring metal guide member movable from a position slightly inwardly of said opening to a position substantially within said opening and beyond the outer end of a film package located within the magazine, a slide on which the guide member is mounted, and a support for said slide carried by the magazine at one side of said opening and yieldable transversely of the magazine.

7. The combination with a film magazine having an inlet opening, of a spring metal guide member including finger portions movable under a wall of a film envelope, a slide on which the guide member is supported, and a transversely yieldable support for the slide carried by the magazine at one side of said opening, said guide member being movable endwise of the magazine to position said finger portions slightly inwardly or slightly outwardly with reference to the outer end of a film package positioned in the magazine.

8. The combination with a film magazine having an exposure wall and an inlet opening, the exposure wall having an inwardly extending projection located centrally thereof adjacent to said opening and acting to hold the edge of a film envelope away from the exposure wall, of a guide member carried by and movable endwise of the magazine in opposite directions in said opening and having finger portions movable between the outer wall of a film envelope and the exposure wall on opposite sides of said projection, said finger portions being successively positionable slightly inwardly and slightly outwardly with reference to the outer end of a film package positioned in the magazine.

9. The combination with a film magazine having an exposure wall and an inlet opening, of a guide member occupying said opening with its free edge engaging the exposure wall of the magazine, said guide member being carried by and movable endwise of the magazine and positionable over the end of an inserted envelope when moved to its innermost position and spaced from the end of the envelope when moved to its outermost position.

10. The combination with a film magazine having an exposure wall and an inlet opening, of a guide member carried by and movable endwise of the magazine, said guide member having finger portions engageable with the exposure wall of the magazine on opposite sides of the transverse center thereof, and means adjacent said inlet opening for deflecting an inserted envelope away from said exposure wall to permit said finger portions of the guide member to enter between the exposure wall and the envelope when moved inwardly, said finger portions being successively positionable slightly inwardly and slightly outwardly with reference to the outer end of a film package positioned in the magazine.

11. The combination with a film magazine having an inlet opening, of a slide located at one side of said opening, said slide being carried by and movable longitudinally of the magazine, and a spring-metal guide member fixed to said slide and extending across the inlet opening.

12. The combination with a film magazine having an exposure wall and an inlet opening, of a slide located at one side of said opening, said slide being carried by and movable longitudinally of the magazine, a spring-metal guide member fixed to said slide and extending across the inlet opening, said guide member including finger portions at its forward edge on opposite sides of its transverse center, and means adjacent said inlet opening for deflecting the edge of an envelope away from the exposure wall of the magazine.

13. The combination with a film magazine having an exposure wall and an inlet opening, of a slide mounted at one side of said opening, said slide being carried by and movable endwise of the magazine, a spring-metal guide member fixed to said slide and extending across the opening, a support on which said slide is movable, a base upon which the support is arranged for transverse movement, and spring means located between said base and the support to actuate the latter and the guide member toward the exposure wall of the magazine.

14. The combination with a film magazine having an exposure wall and an inlet opening, of a channel-shaped base carried by and extending from side to side of the magazine at one side of said opening, a channel-shaped support telescopically arranged on said base and extending from side to side of the magazine, spring means located between the base and the support for actuating the latter away from the base, means for limiting movement of the support on the base, a slide mounted on the support and movable endwise of the magazine, and a spring metal guide member fixed to said slide and extending across the inlet opening into contact with the exposure wall.

15. The combination with a film magazine having an exposure wall and an inlet opening, of a channel-shaped base carried by and extending from side to side of the magazine at one side of said opening, a channel-shaped support telescopically arranged on said base and extending from side to side of the magazine, spring means located between the base and the support for actuating the latter away from the base, means for limiting movement of the support on the base, a slide mounted on the support and movable endwise of the magazine, a spring metal guide member fixed to said slide and extending across the inlet opening into contact with the exposure wall of the magazine, said wall having an inwardly extending projection at its center adjacent to the inlet opening to deflect the edge of an envelope away from the wall, and the guide member being recessed at its center to straddle said projection and having forwardly extending finger portions on opposite sides of said projection engageable under the edge of an envelope.

16. The combination with a film magazine having an exposure wall and an inlet opening, of a channel-shaped base carried by and extending from side to side of the magazine at one side of said opening, a channel-shaped support telescoping on said base and extending from side to side of the magazine, spring means between the base and the support for actuating the latter away from the base, means for limiting such movement, a slide movable on the support, a laterally bent portion at the outer end of the slide, a handle carried by said laterally bent portion, a guide member fixed to the slide, and a flexible light guard secured to the exposure wall with its free end engaging said guide member.

17. A film magazine comprising a body portion having an exposure wall and side walls, a main back wall hinged to the body portion, the body portion having a supplemental back wall extending for a distance beyond said hinged connection and adjacent to the main back wall, and a follower operable to press a film package toward said exposure wall and having attached thereto a leaf spring extending endwise of the magazine and resting against said main back wall and said supplemental back wall respectively.

ISAAC N. ODELL.
FRANCIS MEADE BAILEY.